United States Patent
Uenaka

(10) Patent No.: US 7,209,652 B2
(45) Date of Patent: Apr. 24, 2007

(54) LIGHTING CONTROL APPARATUS WITH A PLURALITY OF LIGHTING DEVICES

(75) Inventor: Yukio Uenaka, Tokyo (JP)

(73) Assignee: Pentax Corporation, Tokyo (JP)

( * ) Notice: Subject to any disclaimer, the term of this patent is extended or adjusted under 35 U.S.C. 154(b) by 153 days.

(21) Appl. No.: 10/969,874

(22) Filed: Oct. 22, 2004

(65) Prior Publication Data

US 2005/0089322 A1  Apr. 28, 2005

(30) Foreign Application Priority Data

Oct. 27, 2003  (JP) ............................. P2003-366052

(51) Int. Cl.
    *G03B 15/03* (2006.01)
(52) U.S. Cl. ..................................... 396/182; 362/11
(58) Field of Classification Search ................ 396/182, 396/155, 180; 348/370, 371; 362/11
    See application file for complete search history.

(56) References Cited

U.S. PATENT DOCUMENTS

| 2,427,969 | A  | * | 9/1947  | Lester ........................ 352/84 |
| 5,570,148 | A  | * | 10/1996 | Hibino et al. ............... 396/182 |
| 6,498,900 | B1 |   | 12/2002 | Nakata et al. |
| 7,052,151 | B2 | * | 5/2006  | Terada et al. ................ 362/16 |
| 7,106,378 | B2 | * | 9/2006  | Kawakami .................. 348/371 |

| 2003/0052992 | A1 | * | 3/2003  | Nakata ........................ 348/371 |
| 2004/0258165 | A1 | * | 12/2004 | Peltonen ..................... 375/257 |

FOREIGN PATENT DOCUMENTS

| JP | 2001-215579 | 8/2001 |
| JP | 2003-101836 | 4/2003 |

OTHER PUBLICATIONS

U.S. Appl. No. 10/795,380 to Okabe, filed Mar. 19, 2004.
U.S. Appl. No. 10/969,873 to Uenaka, filed Oct. 22, 2004.
U.S. Appl. No. 10/968,955 to Seo, filed Oct. 21, 2004.

* cited by examiner

*Primary Examiner*—Christopher Mahoney
*Assistant Examiner*—Chia-how Michael Liu
(74) *Attorney, Agent, or Firm*—Greenblum & Bernstein, P.L.C.

(57) ABSTRACT

A lighting control apparatus of a photographing apparatus, comprises a plurality of lighting devices, a continuous imaging control processor, and a pulse-signal generating and control processor. The plurality of lighting devices illuminate a photographic subject by receiving a pulse signal which has a certain cycle in the exposure time. The continuous imaging control processor performs a continuous imaging operation where a plurality of images of the photographic subject are continuously imaged. The pulse-signal generating and controlling processor supplies a pulse signal to each of the lighting devices, cyclically every exposure time, so that one lighting device is illuminated at any given time.

8 Claims, 10 Drawing Sheets

LIGHTING CONTROL APPARATUS WITH A PLURALITY OF LIGHTING DEVICES

BACKGROUND OF THE INVENTION

1. Field of the Invention

The present invention relates to a lighting control apparatus for a photographing apparatus, and in particular to improvement of the lighting action in the continuous or video mode.

2. Description of the Related Art

A lighting device which uses LEDs is proposed, in place of a lighting device which uses strobe radiation such as a xenon pipe which has been widely used with photographing apparatus, such as a camera. LEDs can be driven at a low voltage, and the circuit construction of the LED is simple.

However, the temperature of an LED goes up due to continuous radiation of the LED. The rise in the LED temperature causes a decrease of the quantity of light emitted by the LED. FIG. 1 shows the relation between the temperature rise and the quantity of light emitted by the LED, so that FIG. 1 shows that the quantity of light, in other words, the brightness of the LED, falls along with the temperature rise of the LED.

Japanese unexamined patent publication (KOKAI) No. 2003-101836 discloses a lighting device for a photographing apparatus. The radiation of light from the LEDs is driven by rectangular pulse signals, and a continuous imaging operation can be carried out while the LEDs radiate light.

Because a turn-off period is provided in the pulse signal, the LED radiation caused by this pulse signal is not continuous, hence the temperature rise of the LED due to the heat that occurs with continuous radiation is reduced in comparison to the temperature produced by LED radiation when the direct current signal is used to drive the LED.

FIG. 2 shows a graph where the horizontal axis represents time and the vertical axis represents temperature. The graph shows the difference in temperature rise of the LED due to the direct current signal ((1) in FIG. 2) and the temperature rise of the LED due to the pulse signal ((2) in FIG. 2).

When the pulse signal and the direct current signal are in the on state, the LED for lighting is illuminated.

In the case of the direct current signal, because a constant current flows during the period for which the LED should be illuminated (T0~T5), the temperature of the LED continues to go up.

In the case of the pulse signal, the period for which the LED is not illuminated is the period which the signal is in the off state (T1~T2, T3~T4), so that the temperature of the LED descends in this period (T1~T2, T3~T4). Accordingly, during the illumination period of the LED, the temperature of the LED repeats the rise and descent. As a result, the accumulation of heat is small in comparison with in the case where the direct current signal is used.

However, the above-discussed Japanese unexamined patent publication does not disclose the temperature rise of the LED due to the continuous radiation of the LED in the continuous shot mode.

In this case, a method, where by the heat, which is accumulated in the LED in the previous exposure time, is cooled by turning off the pulse signal during the post-exposure time (the time between the previous exposure time termination and the current exposure time start) is considered. However, when the length of the post-exposure time is shortened in order to increase the number of frames which can be imaged in a unit of time, the cooling of the LED can not be carried out sufficiently by utilizing the post-exposure time. Accordingly, whenever the exposure operation is continuously carried out, the heat of the LED which can not be cooled is accumulated, so that the temperature of the LED goes up.

SUMMARY OF THE INVENTION

Therefore, an object of the present invention is to provide an apparatus that restrains the accumulation of heat caused by the continuous radiation of an LED etc. of a lighting device, during the continuous shot mode or video mode.

According to the present invention, a lighting control apparatus of a photographing apparatus, comprises a plurality of lighting devices, a continuous imaging control processor, and a pulse-signal generating and control processor.

The plurality of lighting devices illuminate a photographic subject by receiving a pulse signal which has a certain cycle in the exposure time.

The continuous imaging control processor performs a continuous imaging operation where a plurality of images of the photographic subject are continuously imaged.

The pulse-signal generating and controlling processor supplies the pulse signal to each of the lighting devices, cyclically every exposure time, so that one lighting device is illuminated at any given time.

The objects and advantages of the present invention will be better understood from the following description, with reference to the accompanying drawings in which.

DESCRIPTION OF THE PREFERRED EMBODIMENTS

Figure 1:
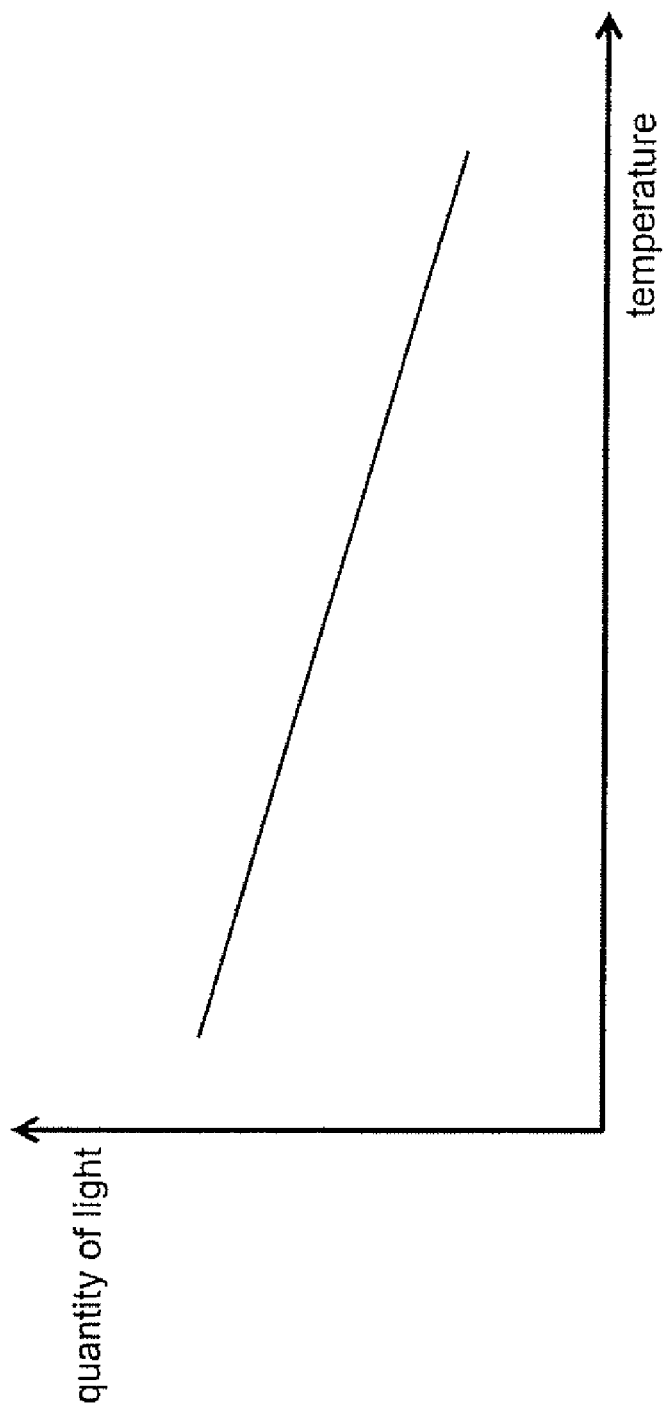
FIG. 1 shows a graph of the relationship between temperature of the LED and the quantity of light output by the LED.
Figure 2:
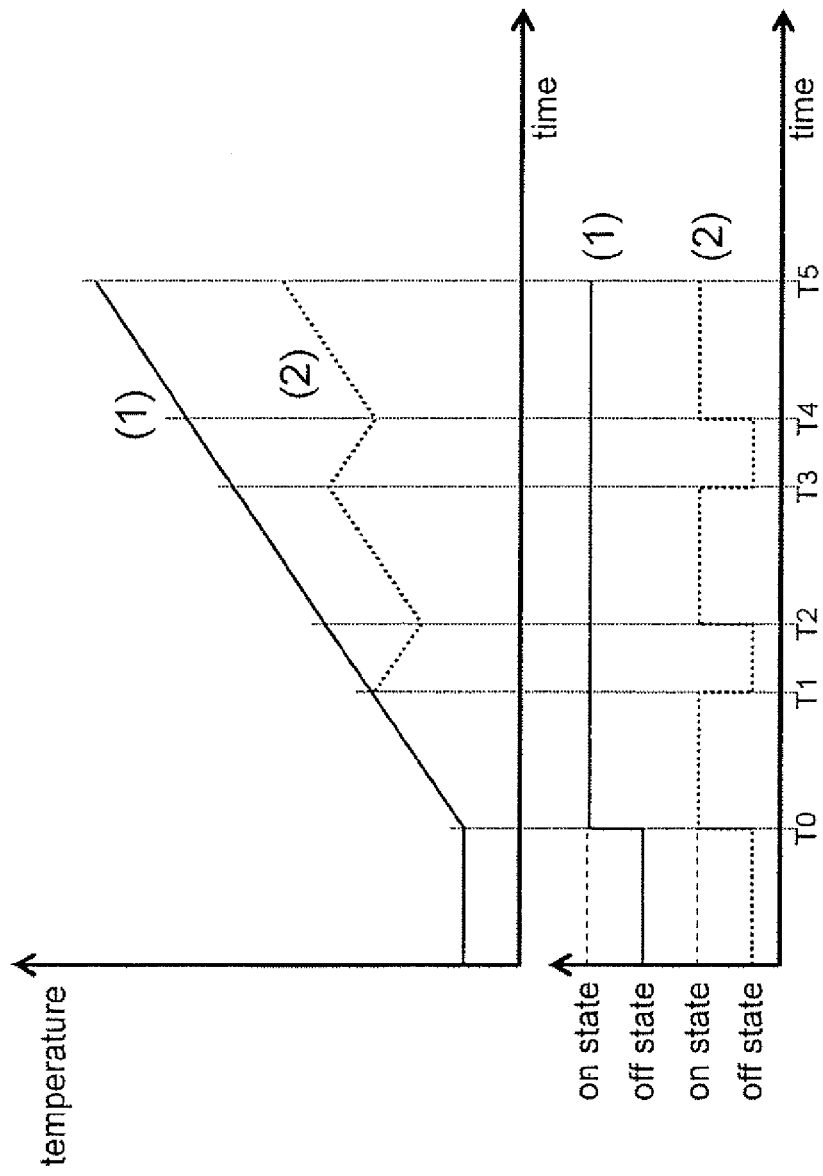
FIG. 2 shows a graph of the temperature change in the LED over time for the direct current signal and for the pulse signal.
Figure 3:
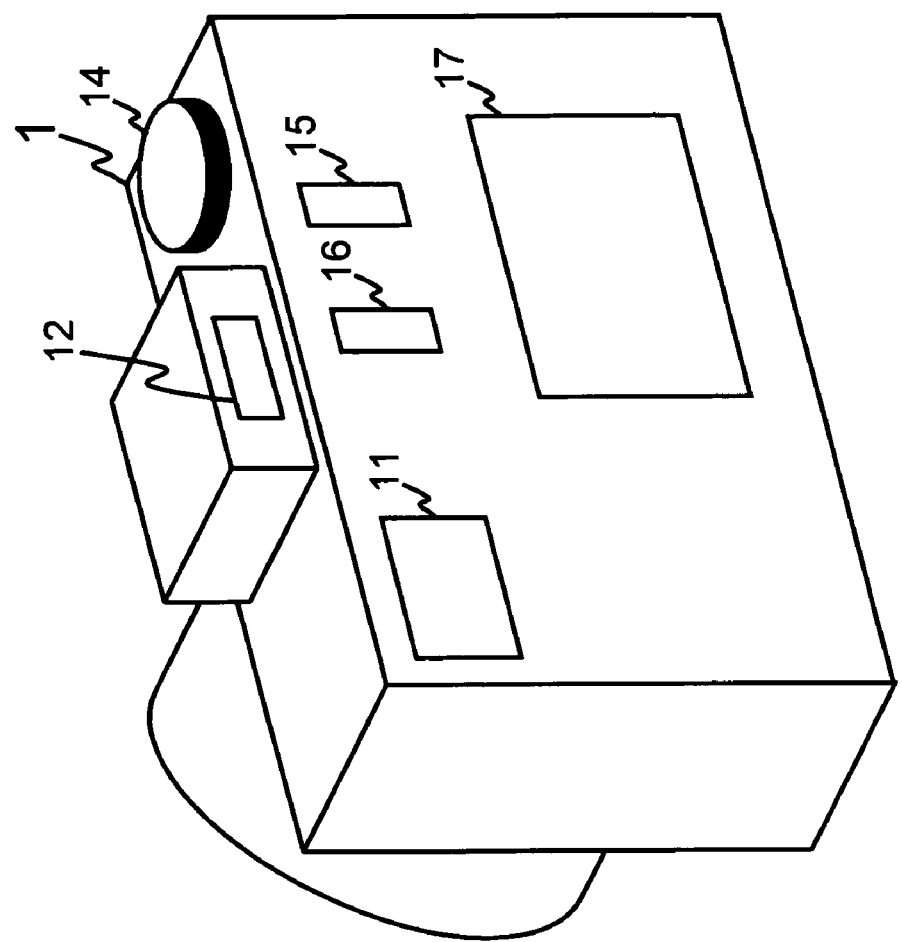
FIG. 3 is a perspective view of a photographing apparatus of this embodiment viewed from back side of the photographing apparatus.
Figure 4:
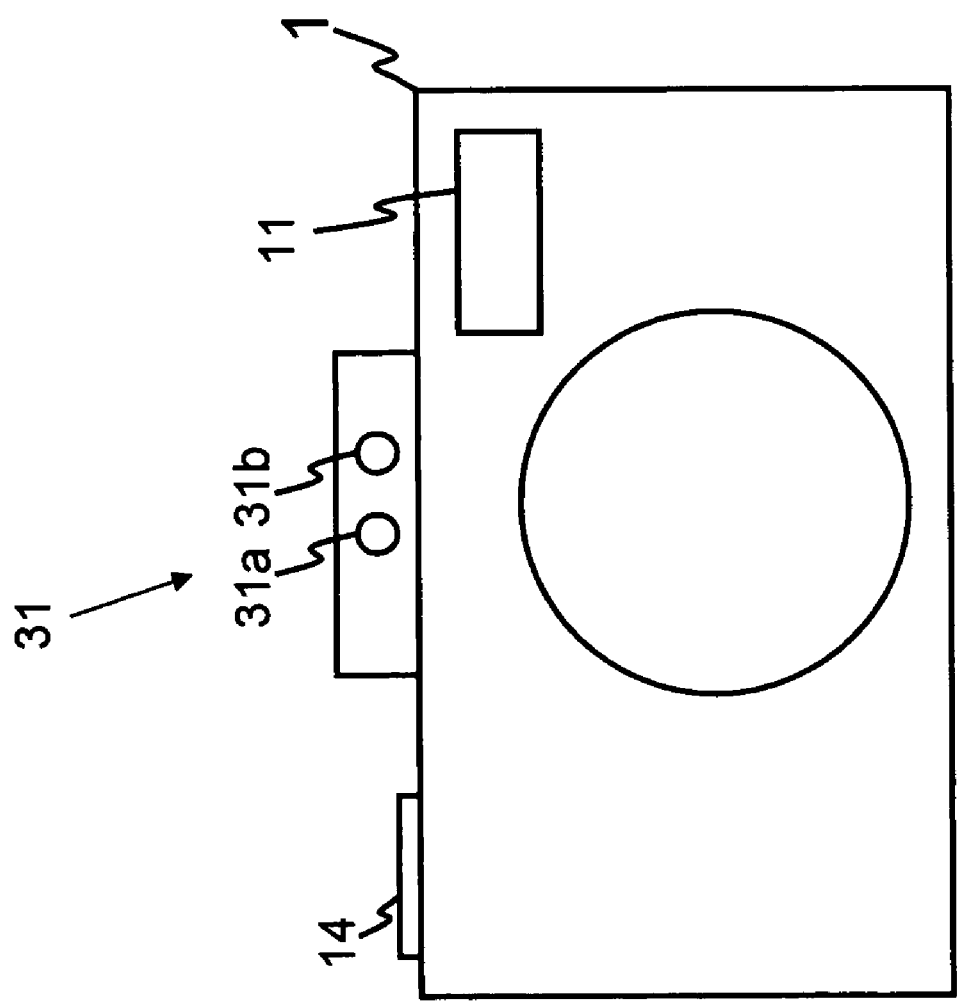
FIG. 4 is a front view of the photographing apparatus of this embodiment.
Figure 5:
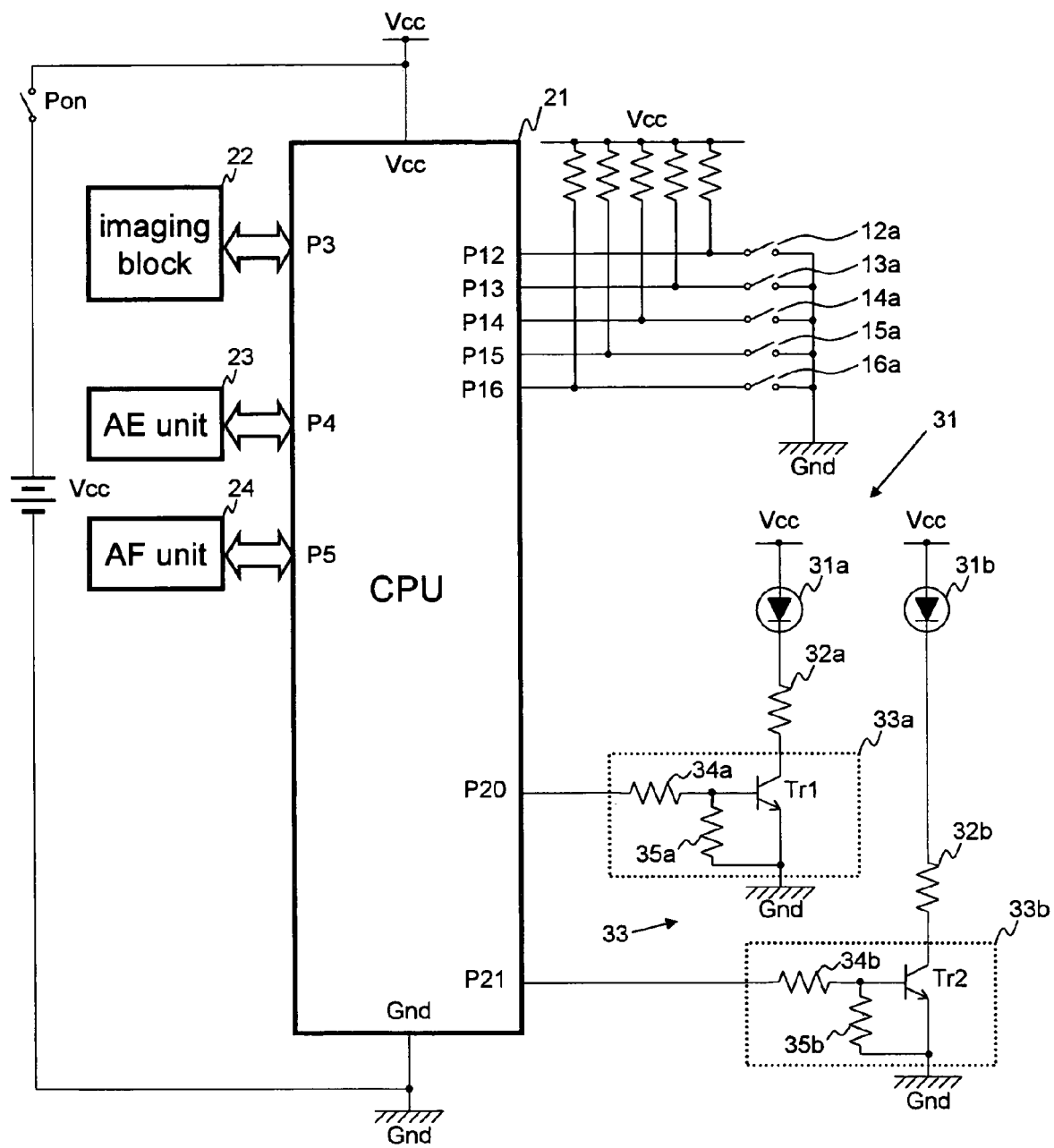
FIG. 5 is a circuit construction figure of the photographing apparatus.

The present invention is described below with reference to the embodiments shown in the drawings. FIG. 3 shows a perspective view of a photographing apparatus 1 which comprises a lighting control unit of this embodiment, viewed from the back of the photographing apparatus 1. FIG. 4 is a front view of the photographing apparatus 1. FIG.

5 is a circuit construction diagram of the photographing apparatus 1. In this embodiment, the photographing apparatus 1 is a digital camera.

The photographing apparatus 1 comprises an optical finder 11, an LED on button 12, an LED on switch 12a, a photometric switch 13a, a release button 14, a release switch 14a, a continuous shot button 15, a continuous shot switch 15a, a video button 16, a video switch 16a, an LCD monitor 17, an LED 31 for lighting, and an illuminating circuit 33.

The photographing apparatus 1 comprises an imaging block 22, an AE (automatic exposure) unit 23, and an AF (automatic focusing) unit 24. The imaging block 22 is composed of an imaging device such as a CCD etc. (which is not depicted). The AE unit 23 performs the photometric operation for the photographic subject, calculates the photometric values, and calculates the aperture value and the time length of the exposure time which is needed for the imaging corresponding to the photometric values. The AF unit 24 performs the AF sensing operation, and performs the focusing operation which is needed for the imaging, corresponding to the result of the AF sensing operation.

The optical finder 11 is an apparatus which can be used to optically observe the photographic subject image. The photographic subject image can also be indicated on the LCD 17, as an image which is imaged by the imaging block 22.

The LED 31 has a first LED 31a and a second LED 31b. When the LED on button 12 is pushed by the operator, the LED on switch 12a changes to the on state, so that one of the first LED 31a and the second LED 31b is illuminated in the exposure time.

When the first LED 31a is illuminated in the exposure time, the second LED 31b is turned off. When the second LED 31b is illuminated in the exposure time, the first LED 31a is turned off.

When the release button 14 is half pushed by the operator, the photometric switch 13a changes to the on state, so that the photometric operation, the AF sensing operation, and the focusing operation are performed.

When the release button 14 is fully pushed by the operator, the release switch 14a changes to the on state, so that the imaging operation is performed.

When the continuous shot button 15 is pushed by the operator, the continuous shot switch 15a changes to the on state, and a plurality of the photographic subject images are continuously imaged at, for example, three frames per second, while the release switch 14a is in the on state. When the continuous shot switch 15a is in the on state, the photographing apparatus 1 is in a continuous shot mode.

When the video button 16 is pushed by the operator, the video switch 16a changes to the on state, so that the photographic subject image is imaged at a predetermined frame interval, and is stored as a moving picture, while the release switch 14a is in the on state. When the video switch 16a is in the on state, the photographing apparatus 1 is in a video mode.

The first LED 31a and the second LED 31b are lighting devices which supply a proper quantity of light to the photographic subject, by illuminating, during an exposure time, as electric flashes, in accordance with an exposure timing, when there is insufficient lighting of the photographic subject.

The illuminating circuit 33 has a first illuminating circuit 33a and a second illuminating circuit 33b.

The first LED 31a is driven in accordance with pulse signals which are output from the CPU 21 and are supplied through the first illuminating circuit 33a (which is described later).

The second LED 31b is driven in accordance with pulse signals which are output from the CPU 21 and are supplied through the second illuminating circuit 33b (which is described later).

The pulse signals are rectangular wave signals of which the on state and off state are continuously switched according to a certain on/off cycle (which is equal to the reciprocal of the value of the duty frequency). It is desirable that the value of the duty frequency is larger than or equal to 50 Hz, in other words the value of the on/off cycle should be less than or equal to $\frac{1}{50}$ of a second, so that flickering does not occur in the first LED 31a and the second LED 31b. In this embodiment, the value of the duty frequency is set in the CPU 21 in advance, however the value of the duty frequency may be changed by the operator.

The on/off cycles of the first LED 31a and the second LED 31b are synchronized with the on/off cycle of the pulse signal, during illumination.

The LED 31 has at least two LEDs (which are the first LED 31a and the second LED 31b), however the first LED 31a and second LED 31b may respectively have a plurality of LEDs. The plurality of LEDs, which compose the first LED 31a, is illuminated and turned off with the same timing. Similarly, the plurality of LEDs, which compose the second LED 31b, is illuminated and turned off with the same timing.

Figure 9:
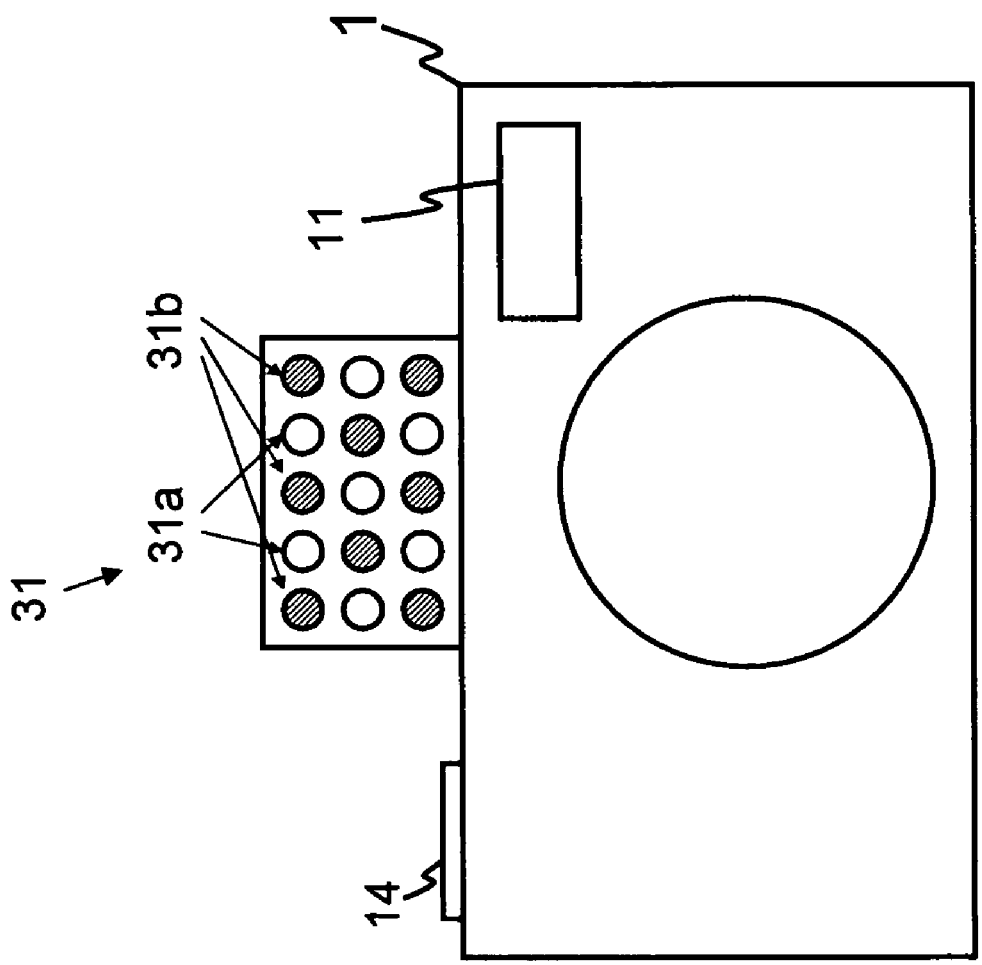
FIG. 9 is a front view of the photographing apparatus of this embodiment, when the first LED and the second LED comprise a plurality of LEDs.

In FIG. 4, the first LED 31a and the second LED 31b are arranged at separate locations, however the first LED 31a and the second LED 31b may be differently arranged. For example, the first LED 31a and the second LED 31b respectively have a plurality of LEDs, each LED which composes the first LED 31a and each LED which composes the second LED 31b are arranged alternately and form a checkered structure (see FIG. 9).

In this embodiment, a duty ratio is defined as the ratio of time in the on state, to the time of one cycle of the pulse signal. The pulse signal is output to one of the first LED 31a and the second LED 31b with a duty ratio D1 during the exposure time in which an imaging operation is performed, when the photographing apparatus 1 is in the continuous shot or video mode. The pulse signal is not output to the other of the first LED 31a and the second LED 31b during the exposure time, when the photographing apparatus 1 is in the continuous shot or video mode (0% duty ratio). The pulse signal is not output between the exposure time termination and the next exposure time start, in other words the post-exposure time, or at a time other than that for the exposure operation (0% duty ratio). The value of the duty ratio D1 is larger than 0%, and is smaller than 100%. The duty ratio D1 is set in the CPU 21 in advance.

In this embodiment, whenever the LED on switch 12a is switched to the on state by the operator, one of the first LED 31a and the second LED 31b is automatically illuminated in the exposure time, however one of the first LED 31a and the second LED 31b may be automatically illuminated in the exposure time, corresponding to the photometric value obtained from the photometric operation.

The various output commands corresponding to the input signals of these switches are controlled by the CPU 21.

The information whether the LED on switch 12a is in the on state or in the off state, is input to a port P12 of the CPU 21 as a 1 bit digital signal. The information whether the photometric switch 13a is in the on state or in the off state, is input to a port P13 of the CPU 21 as a 1 bit digital signal. The information whether the release switch 14a is in the on state or in the off state, is input to a port P14 of the CPU 21 as a 1 bit digital signal. The information whether the continuous shot switch 15a is in the on state or in the off state, is input to a port P15 of the CPU 21 as a 1 bit digital signal. The information whether the video switch 16a is in the on state or in the off state, is input to a port P16 of the CPU 21 as a 1 bit digital signal.

The imaging block 22 is connected to a port P3 of the CPU 21 for inputting and outputting signals. The AE unit 23 is connected to a port P4 of the CPU 21 for inputting and outputting signals. The AF unit 24 is connected to a port P5 of the CPU 21 for inputting and outputting signals.

The first illuminating circuit 33a which illuminates the first LED 31a, is connected to a port P20 of the CPU 21. The port 20 of the CPU 21 outputs first control signals for outputting the pulse signals with the duty ratio D1 from the first illuminating circuit 33a.

The pulse signals output from the first illuminating circuit 33a are supplied to the first LED 31a through a first limited resistor 32a.

The first illuminating circuit 33a is composed of a first transistor Tr1, a first bias resistor 34a, and a second bias resistor 35a. The first transistor Tr1 is an NPN transistor which performs the switching of the pulse signal supplied to the first LED 31a, and whose base is connected to the CPU 21 through the first bias resistor 34a. The second bias resistor 35a is connected between the base of the first transistor Tr1 and the emitter of the first transistor Tr1.

Similarly, the second illuminating circuit 33b which illuminates the second LED 31b, is connected to a port P21 of the CPU 21. The port 21 of the CPU 21 outputs second control signals for outputting the pulse signals with the duty ratio D1 from the second illuminating circuit 33b.

The pulse signals output from the second illuminating circuit 33b are supplied to the second LED 31b through a second limited resistor 32b.

The second illuminating circuit 33b is composed of a second transistor Tr2, a third bias resistor 34b, and a fourth bias resistor 35b. The second transistor Tr2 is an NPN transistor which performs the switching of the pulse signal supplied to the second LED 31b, and whose base is connected to the CPU 21 through the third bias resistor 34b. The fourth bias resistor 35b is connected between the base of the second transistor Tr2 and the emitter of the second transistor Tr2.

The CPU 21 supplies the same pulse signal with the duty ratio D1 to the first LED 31a and the second LED 31b, in accordance with an exposure timing, however an output timing with which the pulse signal is supplied to the first LED 31a is different from an output timing with which the pulse signal is supplied to the second LED 31b.

Or, when the pulse signal with the duty ratio D1 is supplied to the first LED 31a, the pulse signal with the duty ratio D1 is not supplied to the second LED 31b. When the pulse signal with the duty ratio D1 is supplied to the second LED 31b, the pulse signal with the duty ratio D1 is not supplied to the first LED 31a. In the continuous shot mode or the video mode, the pulse signal is supplied to the first LED 31a and the second LED 31b alternately every exposure time.

Accordingly, the CPU 21, the first illuminating circuit 33a, and the second illuminating circuit 33b have a pulse-signal generating and controlling function which supplies the pulse signal to one of the first LED 31a and the second LED 31b with the duty ratio D1.

When the release button 14 is half pushed, the photometric switch 13a is set in the on state, so that the port P13 inputs the on state signal. The CPU 21 drives an AE sensor (which is not depicted) of the AE unit 23, so that the AE unit 23 performs the photometric operation of the photographic subject, calculates the photometric value, and calculates the aperture value and the exposure time which are needed for imaging, corresponding to the photometric value. The CPU 21 drives a sensor (which is not depicted) of the AF unit 24, so that the AF unit 24 performs the AF sensing operation, drives a lens control circuit of the AF unit 24 (which is not depicted), and performs the focusing operation which is needed for imaging, by moving the lens position in the light axis direction, corresponding to the result of the AF sensing operation.

When the release button 14 is fully pushed, the release switch 14a is set in the on state, so that the port 14 inputs the on state signal. The CPU 21 performs the imaging operation, or the CPU 21 drives an aperture mechanism (which is not depicted) corresponding to the aperture value, the CPU 21 drives a release of the shutter mechanism (which is not depicted) with a predetermined shutter speed, and drives the imaging block 22 for the exposure.

When the LED on switch 12a and the release switch 14a are set in the on state, on state signals are input to the ports P12 and P14, so that the pulse signal is output in accordance with the exposure timing of the imaging block 22, through the first illuminating circuit 33a or the second illuminating circuit 33b, for illuminating the first LED 31a or the second LED 31b, controlled by the CPU 21.

When the release switch 14a and the continuous shot switch 15a are set in the on state, on state signals are input to the ports P14 and P15. The imaging operation controlled by the CPU 21, is continuously performed at certain intervals, while the release switch 14a is in the on state, in other words the release of the shutter mechanism is driven, the imaging block 22 is driven, and the exposure operation is performed. The certain intervals are set in the photographing apparatus 1 by the operator, in order to take continuous still images, for example ⅓ second. Accordingly, the CPU 21 has a continuous shot control function which continuously performs a plurality of exposure operations of the photographic subject.

When the release switch 14a and the video switch 16a are set in the on state, on state signals are input to the ports P14 and P16. The imaging operation controlled by the CPU 21, is continuously performed at predetermined intervals, while the release switch 14a is in the on state, in other words the release of the shutter mechanism is driven, the imaging block 22 is driven, and the exposure operation is performed. The predetermined intervals are set in the photographing apparatus 1 in advance, in order to take a video image, for example ¹⁄₆₀ second (which is equal to one frame period).

When the LED on switch 12a, the release switch 14a, and the continuous shot switch 15a are set in the on state, a pulse signal is output alternately every exposure time, to the first LED 31a or the second LED 31b, through the first illuminating circuit 33a or the second illuminating circuit 33b, on the basis of the first control signal from the port 20 of the CPU 21 or the second control signal from the port 21 of the CPU 21, with the duty ratio D1.

Or, when the pulse signal with the duty ratio D1 was output to the first LED 31a, through the first illuminating circuit 33a, on the basis of the first control signal from the port 20 of the CPU 21, in a previous exposure time, the pulse signal with the duty ratio D1 is output to the second LED 31b, through the second illuminating circuit 33b, on the basis of the second control signal from the port 21 of the CPU 21, in the current exposure time, so that the pulse signal with the duty ratio D1 is output to the first LED 31a, through the first illuminating circuit 33*a,* on the basis of the first control signal from the port 20 of the CPU 21, in the next exposure time.

In the post-exposure time, the pulse signal is not output. Accordingly, either the first LED 31*a* or the second LED 31*b* is illuminated in the exposure time, so that both the first LED 31*a* and the second LED 31*b* are not illuminated in the post-exposure time.

When the LED on switch 12*a*, the release switch 14*a*, and the video switch 16*a* are set in the on state, the pulse signal is output to either the first LED 31*a* or the second LED 31*b*, through either the first illuminating circuit 33*a* or the second illuminating circuit 33*b*, on the basis of one of the first control signal from the CPU 21 and the second control signal from the CPU 21, during the exposure time. This is similar to when the LED on switch 12*a*, the release switch 14*a*, and the continuous shot switch 15*a* are set in the on state.

Figure 6:
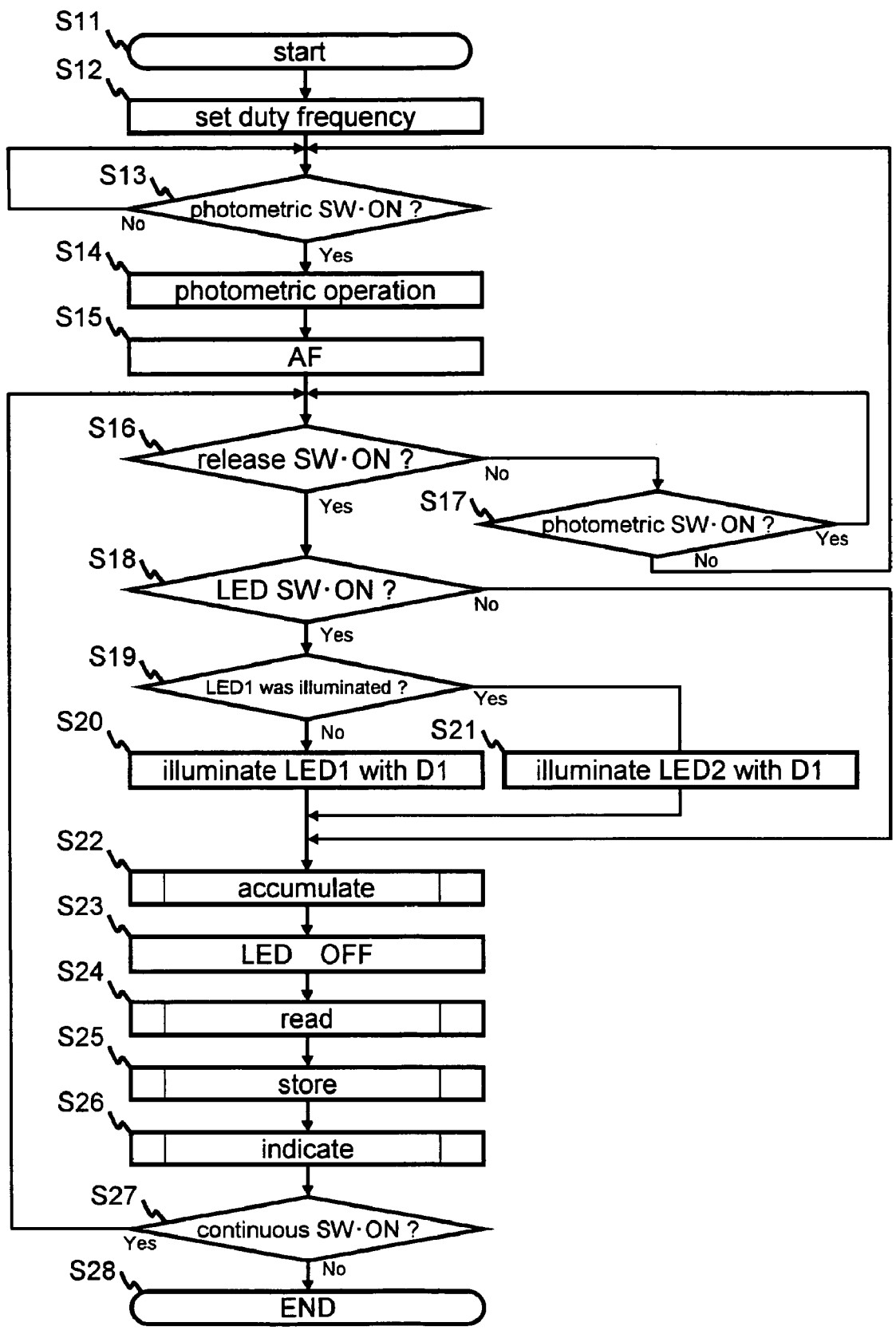
FIG. 6 is a flowchart of the LED illumination process in the exposure time, in the continuous shot mode.
Figure 7:
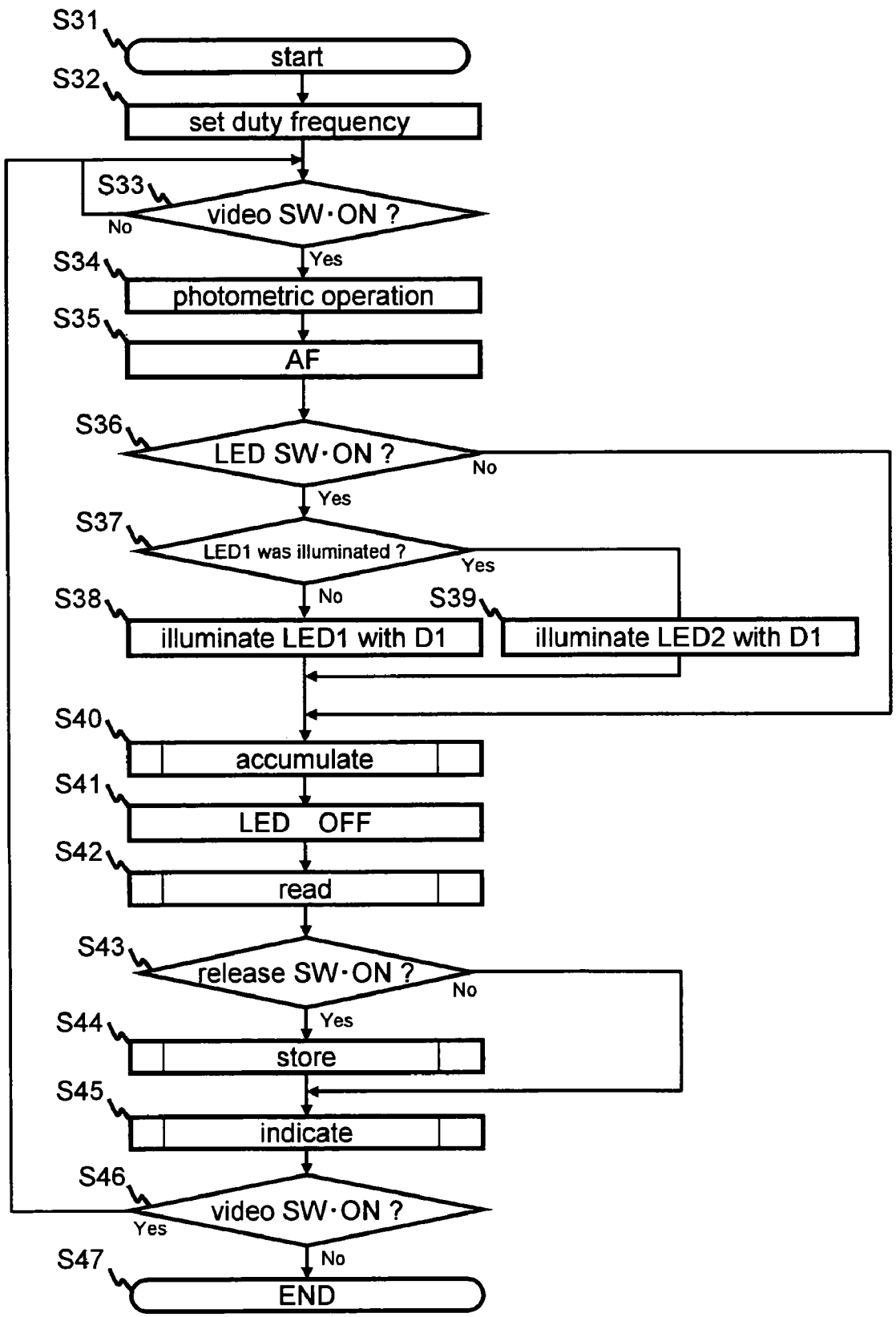
FIG. 7 is a flowchart of the LED illumination process in the exposure time, in the video mode.

However, the operation flow in the continuous shot mode (see FIG. 6) is different from the operation flow in the video mode (see FIG. 7).

The control of the first LED 31*a* and the second LED 31*b* in the exposure time, in the continuous shot mode (the condition where the continuous shot switch 15*a* is in the on state), is explained by the flowchart in FIG. 6.

In step S11, the power supply of the photographing apparatus 1 is set in the on state. In step S12, the duty frequency is set in the CPU 21. However, the value of the duty frequency is set in the CPU 21 in advance.

In step S13, it is judged whether the photometric switch 13*a* is set in the on state. When it is judged that the photometric switch 13*a* is not set in the on state, the process in step S13 is repeatedly carried out. When it is judged that the photometric switch 13*a* is set in the on state, the AE sensor of the AE unit 23 is driven, the photometric operation is performed, and the aperture value and the exposure time are calculated in step S14. In step S15, the AF sensor of the AF unit 24 is driven, the AF sensing is performed, and the focusing operation is performed, by driving the lens control circuit of the AF unit 24.

In step S16, it is judged whether the release switch 14*a* is set in the on state. When it is judged that the release switch 14*a* is not in the on state, it is judged whether the photometric switch 13*a* is set in the on state, in step S17. When it is judged that the photometric switch 13*a* is set in the on state in step S17, the flow is returned to step S16. When it is judged that the photometric switch 13*a* is not set in the on state in step S17, the flow is returned to step S13. When it is judged that the release switch 14*a* is set in the on state in step S16, it is judged whether the LED on switch 12*a* is set in the on state in step S18.

When it is judged that the LED on switch 12*a* is not set in the on state in step S18, both the first LED 31*a* and the second LED 31*b* are not illuminated in the exposure time which corresponds to the on state of the release switch 12*a*, so that the exposure operation, in other words electric charge accumulation of the CCD, is performed under the condition where the LED 31 is turned off, in step S22.

When it is judged that the LED on switch 12*a* is set in the on state in step S18, it is judged whether the first LED 31*a* was illuminated in the previous exposure time in the continuous shot mode.

When it is judged that the first LED 31*a* was not illuminated in the previous exposure time, the first LED 31*a* receives the pulse signal with the duty ratio D1 and illuminates in the current exposure time which corresponds to the on state of the release switch 12*a* in step 16, in step 20, so that the exposure operation, in other words electric charge accumulation of the CCD, is performed under the condition where the first LED 31*a* is illuminated in step S22.

When it is judged that the first LED 31*a* was illuminated in the previous exposure time, the second LED 31*b* receives the pulse signal with the duty ratio D1 and illuminates in the current exposure time which corresponds to the on state of the release switch 12*a* in step 16, in step S21, so that the exposure operation, in other words electric charge accumulation of the CCD, is performed under the condition where the second LED 31*b* is illuminated in step S22.

After the exposure time is terminated, the first LED 31*a*, which is illuminated in step S20, or the second LED 31*b*, which is illuminated in step S21, is turned off in step S23. In step S24, the electric charge which is accumulated in the CCD in the exposure time is read, so that, in step S25, the electric charge which is read is stored in the memory of the photographing apparatus 1, as the image signal which is imaged by the imaging block 22. In step S26, the image signal which is stored, is indicated on the LCD monitor 17.

In step S27, it is judged whether the continuous shot switch 15*a* is set in the on state. When it is judged that the continuous shot switch 15*a* is set in the on state, the process is returned to step S16, so that the next exposure operation is carried out. When it is judged that the continuous shot switch 15*a* is not set in the on state, the control of the first LED 31*a* and the second LED 31*b* in the exposure time, in the continuous shot mode (where the continuous shot switch 15*a* is in the on state), is finished.

Next, the control of the first LED 31*a* and the second LED 31*b* in the exposure time, in the video mode (where the video switch 16*a* is in the on state), is explained by the flowchart in FIG. 7.

In step S31, the power supply of the photographing apparatus 1 is set in the on state. In step S32, the duty frequency is set in the CPU 21. However, the value of the duty frequency is set in the CPU 21 in advance.

In step S33, it is judged whether the video switch 16*a* is set in the on state. When it is judged that the video switch 16*a* is not set in the on state, the process in step S33 is repeatedly carried out. When it is judged that the video switch 16*a* is set in the on state, the AE sensor of the AE unit 23 is driven, the photometric operation is performed, and the aperture value and the exposure time are calculated in step S34. In step S35, the AF sensor of the AF unit 24 is driven, the AF sensing is performed, and the focusing operation is performed, by driving the lens control circuit of the AF unit 24.

In step S36, it is judged whether the LED on switch 12*a* is set in the on state. When it is judged that the LED on switch 12*a* is not set in the on state, the processes of steps S36, S37, S38, and S39 are skipped, both the first LED 31*a* and the second LED 31*b* are not illuminated in the exposure time (one frame period) which corresponds to the on state of the video switch 16*a*, so that the exposure operation, in other words, the electric charge accumulation of the CCD, is performed under the condition where the LED 31 is turned off, for one frame period, in step S40.

When it is judged that the LED on switch 12*a* is set in the on state in step S36, it is judged whether the first LED 31*a* was illuminated in the previous exposure time (one frame period) in the video mode.

When it is judged that the first LED 31*a* was not illuminated in the previous exposure time (one frame period), the first LED 31*a* receives the pulse signal with the duty ratio D1 and illuminates in the current exposure time (one frame period) which corresponds to the on state of the video switch 16*a* in step 33, in step 38, so that the exposure operation, in other words electric charge accumulation of the CCD, is performed under the condition where the first LED 31*a* is illuminated, for one frame period, in step S40.

When it is judged that the first LED 31*a* was illuminated in the previous exposure time (one frame period), the second LED 31*b* receives the pulse signal with the duty ratio D1 and illuminates in the current exposure time (one frame period) which corresponds to the on state of the video switch 16*a* in step 33, in step S39, so that the exposure operation, in other words electric charge accumulation of the CCD, is performed under the condition where the second LED 31*b* is illuminated, for one frame period, in step S40.

After the exposure time is terminated (one frame period has passed), the first LED 31*a* which is illuminated in step S38, or the second LED 31*b* which is illuminated in step S39, is turned off in step S41. In step S42, the electric charge which is accumulated in the CCD in the exposure time (one frame period) is read.

In step S43, it is judged whether the release switch 14*a* is set in the on state. When it is judged that the release switch 14*a* is set in the on state, in step S44, the electric charge which is read is stored in the memory of the photographing apparatus 1, as the image signal which is imaged by the imaging block 22, so that in step S45, the image signal which is stored, is indicated on the LCD monitor 17. When it is judged that the release switch 14*a* is not set in the on state, the process of step S44 is skipped, so that the image signal, which is not stored, is indicated on the LCD monitor 17 in step S45.

In step S46, it is judged whether the video switch 16*a* is set in the on state. When it is judged that the video switch 16*a* is set in the on state, the process is returned to step S33, so that the next exposure operation is carried out. When it is judged that the video switch 16*a* is not set in the on state, the control of the first LED 31*a* and the second LED 31*b* in the exposure time (one frame period), in the video mode (where the video switch 16*a* is in the on state), is finished.

Figure 8:
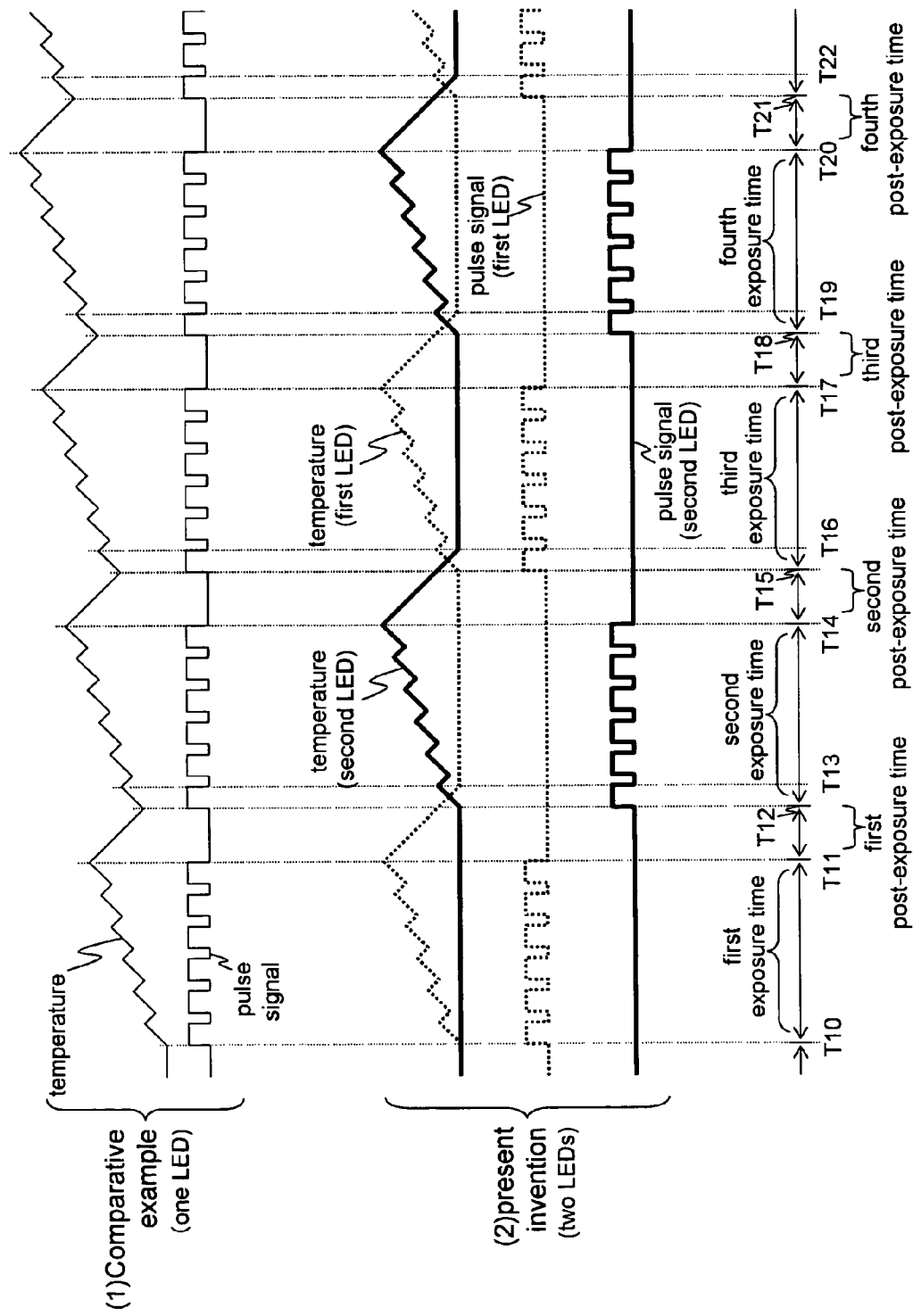
FIG. 8 is a timing chart which shows the relationship between the pulse signal and the temperature change of the LED when illuminating in the exposure time in the continuous shot mode.

Next, the pulse signal and the temperature change over time for the first LED 31*a* and the second LED 31*b* are explained for the case where the illuminating of the first LED 31*a* and the second LED 31*b* is controlled in the exposure time, in the continuous shot mode, by using the timing chart in FIG. 8. FIG. 8 shows first, and second illuminating patterns of the LED 31 in the exposure time, in the continuous shot mode.

The first illuminating pattern is the pattern in which one LED is illuminated in the continuous shot mode, in the comparative example ((1) in FIG. 8).

The second illuminating pattern is the pattern in which two LEDs are illuminated alternately every exposure time, in the continuous shot mode, in this embodiment ((2) in FIG. 8).

In the first pattern of FIG. 8, the lines of the temperature change and the pulse signal of the LED are solid lines. In second pattern of FIG. 8, the lines of the temperature change and the pulse signal of the first LED 31*a* are dotted lines, so that the lines of the temperature change and the pulse signal of the second LED 31*b* are thick solid lines.

In FIG. 7, the value of the duty ratio D1 is larger than or equal to 50%. Furthermore, the temperature rise over time when using the first LED 31*a* and the second LED 31*b* (inclination in the positive direction) and the temperature descent over time when the first LED 31*a* and the second LED 31*b* are turned off (inclination in the negative direction) are the same.

However, they do not have to be the same, and the value of the duty ratio D1 does not have to be larger than or equal to 50%. The effect that cools the first LED 31*a* and the second LED 31*b* is obtained.

While the pulse signal is in the on state, the LED illuminates, so that the temperature of the LED goes up. In the exposure time, the pulse signal switches between the on state and the off state repeatedly. Because the length of the on state of one cycle in the pulse signal is longer than the length of the off state of one cycle in the pulse signal, the temperature of the LED goes up in the exposure time.

In the first pattern of the comparative example (see (1) in FIG. 8), the pulse signal repeatedly switches between the on state and the off state in the first exposure time (T10~T11), so that the LED illuminates and the temperature of the LED goes up. Next, the LED is turned off in the first post-exposure time (T11~T12), so that the temperature of the LED descends.

However, because the second exposure operation is started at point T12 before point T13 when the temperature condition of the LED can be returned to the same condition as before the first exposure operation (T10 in FIG. 8), the pulse signal repeatedly switches between the on state and the off state in the second exposure time (T12~T14), so that the LED illuminates under the condition where the heat of the LED is accumulating. Accordingly, the temperature of the LED further goes up.

Similarly, the third exposure operation (T15~T17), and the fourth exposure operation (T18~T20) are carried out, so that the temperature of the LED continuously goes up. The temperature rise of the LED causes the decrease in light quantity.

In the second pattern of this embodiment (see (2) in FIG. 8), the pulse signal repeatedly switches between the on state and the off state in the first exposure time (T10~T11), so that the first LED 31*a* illuminates and the temperature of the first LED 31*a* goes up. Next, the first LED 31*a* is turned off for a sufficient period which includes the first post-exposure time (T11~T12), the second exposure time (T12~T14), and the second post-exposure time (T14~T15), until point T15 when the first LED 31*a* is illuminated again. Accordingly, the temperature of the first LED 31*a* can be returned to the same condition as before the first exposure operation (T10 in FIG. 8), utilizing the sufficient period.

While the first LED 31*a* is turned off to reduce its temperature in the period from point T11 to point T13, the second exposure operation is started at point T12. In the second exposure time (T12~T14), the second LED 31*b* is used for illuminating, so that cooling of the first LED 31*a* is not prevented in the second exposure time.

Similar to the first LED 31*a*, the pulse signal repeatedly switches between the on state and the off state in the second exposure time (T12~T14), so that the second LED 31*b* illuminates and the temperature of the second LED 31*b* goes up. Next, the second LED 31*b* is turned off in a sufficient period which includes the second post-exposure time (T14~T15), the third exposure time (T15~T17), and the third post-exposure time (T17~T18), until point T18 when the second LED 31*b* is illuminated again. Accordingly, the temperature of the second LED 31*b* can be returned to the same condition as before the second exposure operation (T12 in FIG. 8), utilizing the sufficient period.

The quantity of light emitted by the first LED 31*a* is not reduced by the rise in the temperature of the first LED 31*a*, because the first LED 31*a* is used at regular intervals, even in the continuous shot mode. Similarly, the quantity of light emitted by the second LED 31*b* is not reduced by the rise of the temperature of the second LED 31b, because the second LED 31b is used at the regular intervals, even in the continuous shot mode.

The first LED 31a and the second LED 31b illuminate alternately every exposure operation in the continuous shot mode, so that the heat of the LED 31 is not accumulated due to the continuous use of the LED 31, and the temperature rise of the LED 31 over a certain temperature can be prevented.

When the first LED 31a has a plurality of LEDs, all the LEDs are illuminated at the same time in the exposure time, on the basis of the same pulse signals. Similarly, when the second LED 31b has a plurality of LEDs, all the LEDs are illuminated at the same time in the exposure time, on the basis of the same pulse signals.

The plurality of LEDs of the first LED 31a or the second LED 31b are respectively arranged at a certain interval. However, because the plurality of LEDs are illuminated with the same timing, a plurality of shadows does not occur on the photographic subject due to lag caused by the difference in location of the plurality of the LEDs, and due to the temporal lag of lighting.

FIG. 8 shows the case of the continuous shot mode, however even in the case of the video mode in which the video switch 16a is in the on state, it is possible to restrain the rise in temperature of the LED 31, by radiating the first LED 31a and the second LED 31b alternately every exposure time.

In this embodiment, it was explained that the LED 31 has the first LED 31a and the second LED 31b. The pulse signal is supplied to the first LED 31a and the second LED 31b alternately every exposure time, in the continuous shot mode or the video mode. However, the LED 31 may have a plurality of LEDs. In this case, the pulse signal is supplied to a plurality of LEDs cyclically every exposure time, in the continuous shot mode or the video mode.

When one of a plurality of LEDs is illuminated in the exposure time, the other LEDs are turned off.

Figure 10:
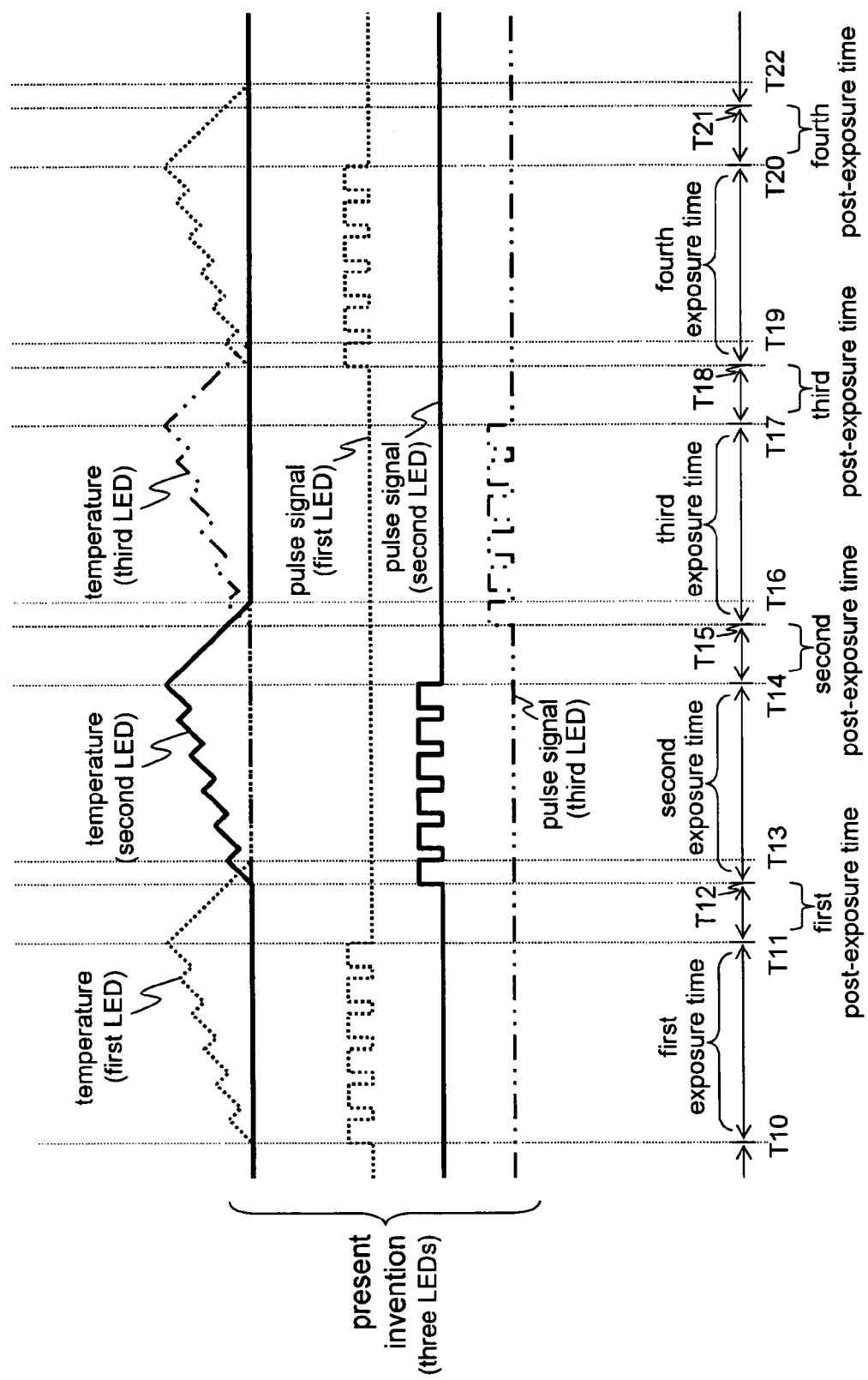
FIG. 10 is a timing chart which shows the relationship between the pulse signal and the temperature change of the LED when illuminating in the exposure time in the continuous shot mode, when the LED has three lighting sources.

For example, the timing chart is explained when the LED 31 has a third LED 31c in addition to the first LED 3la and the second LED 31b, in another embodiment (see FIG. 10). FIG. 10 shows illuminating patterns of the LED 31 in the exposure time, in the continuous shot mode.

The illuminating pattern is the pattern in which three LEDs are illuminated cyclically every exposure time, in the continuous shot mode.

When the first LED 31a is illuminated in the first exposure time, the second LED 31b and the third LED 31c are turned off. When the second LED 31b is illuminated in the second exposure time, the first LED 31a and the third LED 31c are turned off. When the third LED 31c is illuminated in the third exposure time, the first LED 31a and the second LED 31b are turned off.

In the illuminating pattern of FIG. 10, the lines of the temperature change and the pulse signal of the first LED 31a are dotted lines, the lines of the temperature change and the pulse signal of the second LED 31b are thick solid lines, and therefore the lines of the temperature change and the pulse signal of the third LED 31c are the two point chain lines.

In this embodiment, it was explained that the lighting device depends on radiation from an LED, however the lighting device may depend on other radiation devices which are driven by pulse signals, and which illuminate a photographic subject. And further, whose temperature goes up due to continuation use, and whose light quantity falls due to the temperature rise.

In this embodiment, it was explained that the photographing apparatus 1 is a digital camera, however the photographing apparatus 1 may be a film camera.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2003-366052 (filed on Oct. 27, 2003), which is expressly incorporated herein by reference, in its entirety.

The invention claimed is:

1. A lighting control apparatus of a photographing apparatus, comprising:
   a plurality of lighting devices that each have a plurality of light sources that illuminate a photographic subject, the plurality of light sources of the plurality of lighting devices being arranged in a configuration of rows and columns such that light sources of one of said plurality of lighting devices are alternated with light sources of at least another one of said plurality of lighting devices in at least one of the rows and columns;
   a continuous imaging control processor that performs a continuous imaging operation in which a plurality of images of said photographic subject are continuously imaged, and
   a pulse-signal generating and controlling processor that alternately supplies a pulse signal with a cycle to each of said plurality of lighting devices for every exposure time such that light sources of one of said plurality of lighting devices emit light alternately with respect to light sources of at least another one of said plurality of lighting devices for every said exposure time.

2. The lighting control apparatus according to claim 1, wherein on/off cycles of said plurality of lighting devices are synchronized with said cycle, during illumination.

3. The lighting control apparatus according to claim 2, wherein said cycle is a value with which flickering does not occur in said plurality of lighting devices.

4. The lighting control apparatus according to claim 2, wherein said cycle is a value which is equal to or less than 1/50 seconds.

5. The lighting control apparatus according to claim 1, wherein each of said plurality of light sources is an LED.

6. The lighting control apparatus according to claim 1, wherein said plurality of light sources are illuminated and turned off with the same timing.

7. The lighting control apparatus according to claim 1, wherein said plurality of lighting devices are used as an electric flash in said exposure time.

8. The lighting control apparatus according to claim 1, wherein when one of said plurality of lighting devices is illuminated, the other said plurality of lighting devices are turned off.

* * * * *